Patented Jan. 24, 1950

2,495,407

UNITED STATES PATENT OFFICE 2,495,407

PRODUCTION OF ORGANIC FLUORINE COMPOUNDS

James Chapman, Halewood, and Robert Roberts, St. Helens, England, assignors to Imperial Chemical Industries Limited, a corporation of Great Britain No Drawing. Application March 9, 1948, Serial No. 13,951. In Great Britain April 8, 1947

7 Claims. (Cl. 260—653)

This invention relates to the production of fluoro derivatives of saturated aliphatic hydrocarbons and more particularly to the production of monofluoro derivatives of such compounds.

In U. S. Patent No. 2,452,975 there is described a process for the production of a monofluoro derivative of a saturated halohydrocarbon which comprises reacting a saturated aliphatic halogenated hydrocarbon containing at least two atoms of halogen other than fluorine attached to the same terminal carbon atom with hydrogen fluoride in the presence of stannic chloride.

In the said Patent No. 2,452,975 the reaction described involves a substitution of fluorine for a halogen other than fluorine. Hitherto it has been regarded as difficult to obtain any effective general method for the addition of hydrogen fluoride to unsaturated halohydrocarbons such as, for example, vinyl chloride. Because of the advantages which would accrue from the availability of such an addition reaction numerous attempts have been made to discover means whereby it could be carried out.

We are aware that it has been disclosed (see Gilman Organic Chemistry vol. I p. 947) that vinyl chloride; 1,1-dichloropropene-1; and 1,2-dichloropropene-1 may be reacted additively with hydrogen fluoride to give 1,-fluoro-1-chloroethane; 1-fluoro-1,1-dichloropropane and 1,2-dichloro-2-fluoropropane respectively. However no detailed instructions are given illustrating how such processes furnishing high yields of the desired product may be carried out and so far as we have been able to ascertain only poor and irreproducible yields or no yield at all may be obtained when using such an uncatalysed process. Thus we have carried out very many experiments using various molar ratios of vinyl chloride and hydrogen fluoride at different temperatures in the absence or presence of suitable solvents but little or none of the desired product was obtained. Illustrative of the many attempts to prepare 1-fluoro-1-chloroethane by the uncatalysed reaction between vinyl chloride and hydrogen fluoride may be mentioned the following experiments: 4.0 and 4.24 moles of vinyl chloride were reacted with 5.0 and 6.5 moles respectively of anhydrous hydrogen fluoride at a temperature in the range 15 to 20° C. for a period of 3 hours accompanied by vigorous stirring of the reaction mixture. No 1-fluoro-1-chloroethane was formed and 87.7% and 98% respectively of the original vinyl chloride starting material was recovered. In another experiment 4.0 moles of vinyl chloride were heated with 4.5 moles of anhydrous hydrogen fluoride in the presence of 2 moles of acetic acid as solvent for a total period of 17 hours a conversion of vinyl chloride to 1-fluoro-1-chloroethane of only 5.4% being obtained. Again in a further experiment 6.8 moles of vinyl chloride were reacted with 17 moles of anhydrous hydrogen fluoride in the presence of 1.5 moles of acetone as solvent for a total period of 18 hours, but no monofluoromonochloroethane was formed.

Again it has been disclosed (see Journal of Organic Chemistry vol. 3 page 26 1938) that ethylene and hydrogen fluoride may be reacted additively equally well either in the presence or absence of boron trifluoride to give good yields of ethyl fluoride. It thus might possibly be inferred that vinyl chloride may be reacted additively with hydrogen fluoride in the presence of boron trifluoride as catalyst. We have found that boron trifluoride will not catalyse such an addition reaction to any appreciable extent. Thus in one experiment 4.16 moles of vinyl chloride were reacted with 4.5 moles of anhydrous hydrogen fluoride in the presence of 0.15 mole of boron trifluoride at a temperature of 30° C. to 35° C. for a period of 2¼ hours. A 5% conversion only of vinyl chloride to 1-fluoro-1-chloroethane and a 27% conversion to difluoroethane was obtained.

According to the present invention a process for the production of a monofluoro derivative of a saturated aliphatic halohydrocarbon comprises reacting an unsaturated aliphatic halohydrocarbon as hereinafter defined with anhydrous hydrogen fluoride at a temperature in the range 10° C. to 80° C. in the presence of stannic halide as catalyst. Advantageously we use stannic chloride as the catalyst although stannic fluoride may be used and is almost as effective.

The unsaturated aliphatic halohydrocarbons of the present invention may be represented by the general formula $H_2C=CX_1X_2$, where $X_1$ is hydrogen or halogens other than fluorine and $X_2$ is halogen other than fluorine or an alkyl radical containing up to 3 carbon atoms and containing at least one halogen substituent other than fluorine. Again where $X_1$ is a halogen atom other than fluorine $X_2$ may be an alkyl radical containing up to 3 carbon atoms. Illustrative of the compounds which may be treated according to the process of the present invention may be mentioned vinyl chloride, asym-dichloroethylene 2-chloropropylene ($CH_2=C.ClCH_3$) and allyl chloride.

The process of the present invention may be carried out with good results at a temperature in the range 10° C. to 80° C. and particularly good results are obtained when employing a temperature in the range 15° C. to 45° C.

In one form of the invention 1-fluoro-1-chloroethane is prepared by reacting vinyl chloride with anhydrous hydrogen fluoride in the presence of stannic chloride. The proportion of the unsaturated halohydrocarbon and hydrogen fluoride reactants which may be used in the present invention may be varied over a wide range. Thus good results may be obtained when using a molar ratio of vinyl chloride to hydrogen fluoride of 1:1 but a molar excess of substantially 20% of either of the above reactants may be used if desired.

The amount of stannic halide catalyst which may be used in the present invention may be also varied over a wide range. Good results have been obtained using an amount of stannic chloride equal to 2.5% to 22.5% by weight of the unsaturated halohydrocarbon and a considerably greater amount may be used if desired. Particularly good results may be obtained when using an amount of stannic chloride equal to 3% to 5% by weight of the unsaturated halohydrocarbon.

The process may be carried out under widely varied conditions of pressure. Good results have been obtained when the reaction is carried out under the vapour pressure of the reaction mixture. Thus in the production of 1-fluoro-1-chloroethane the vinyl chloride, hydrogen fluoride and stannic chloride may be charged into a cooled autoclave and the temperature is then raised to say 40° C. The reaction mixture is thus subjected to a pressure equal to its own vapour pressure and this may often be of the order of 60 lbs. per square inch. The reaction mixture may be subjected to a pressure considerably in excess of this if desired.

The reaction of the present invention may be conveniently carried out in an autoclave constructed of a suitable metal such as stainless steel or mild steel and which may be so adapted as to permit agitation of the mixture. The same catalyst may be used for several operations and the process may be carried out either batchwise or by a continuous method.

The following examples illustrate but do not limit the invention, all parts being by weight.

Example 1

280 parts of vinyl chloride, 94 parts of anhydrous hydrogen fluoride and 30 parts of stannic chloride were added to a stirred stainless steel autoclave, chilled to 0° C. The autoclave was warmed to 38° C. over 2½ hours including 1¾ hours in the range 30° C. to 38° C. 191 parts of 1-fluoro-1-chloroethane were obtained and 96 parts of unchanged vinyl chloride recovered, representing a 51.6% conversion and a 78.52% yield of 1-fluoro-1-chloroethane based on vinyl chloride.

Example 2

205 parts of vinyl chloride, 75 parts of anhydrous hydrogen fluoride and 80 parts of stannic fluoride were charged into a stainless steel autoclave and the mixture was heated to a maximum of 39.5° C. over a period of two hours. 51 parts of 1-fluoro-1-chloroethane were obtained and 43 parts of vinyl chloride were recovered.

To the same catalyst 480 parts of vinyl chloride and 200 parts of anhydrous hydrogen fluoride were then added and the mixture was subjected to the above treatment. 391 parts of 1-fluoro-1-chloroethane were obtained.

Altogether, nine batches were carried out with the same catalyst the conversions and yields based on vinyl chloride being as follows:

| Run | Percent Conversion | Yield | Run | Percent Conversion | Yield |
|---|---|---|---|---|---|
| 1 | 19 | 24 | 6 | 62.0 | 72.0 |
| 2 | 61.7 | 61.7 | 7 | 52.5 | 65.0 |
| 3 | 48.1 | 56.6 | 8 | 36.0 | 51.0 |
| 4 | 75.0 | 76.8 | 9 | 40.9 | 68.7 |
| 5 | 71.1 | 81.0 | | | |

Example 3

776 parts of asym-dichloroethylene, 175 parts of anhydrous hydrogen fluoride, and 30 parts of stannic chloride were charged to a stainless steel autoclave at a temperature below 10° C. The autoclave was warmed to 35° C. over a period of 1¾ hours. To facilitate the separation of the product, the unchanged asym-dichloroethylene was chlorinated and the 1-fluoro-1,1-dichloroethane distilled off. 306 parts of 1-fluoro-1,1-dichloroethane were obtained representing a conversion of 32.7% based on asym-dichloroethylene.

Example 4

172 parts of 2-chloropropylene, 55 parts of anhydrous hydrogen fluoride and 10 parts of stannic chloride were charged into an autoclave, chilled to −30° C. The autoclave was then heated to 30° C. and held at this temperature with stirring for 1½ hours. The pressure developed was the vapour pressure of the system and did not exceed 20 pounds per square inch. The reaction mixture was then cooled, washed with aqueous sodium carbonate solution and water and dried over calcium chloride. 70 grams of 2,-fluoro-2-chloropropane were obtained representing a 32% conversion on the 2-chloropropylene charged. 55 grams of the 2-chloropropylene were recovered, a yield of 2-fluoro-2-chloropropane of about 47.4% based on the 2-chloropropylene consumed being realised.

We claim:

1. A process for the production of a monofluoro derivative of a saturated aliphatic halo hydrocarbon which comprises reacting an unsaturated halo hydrocarbon having a formula selected from the group consisting of

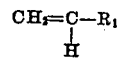

and

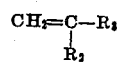

wherein $R_1$ is a radical selected from the group consisting of halogen of atomic weight greater than fluorine and alkyl of up to three carbon atoms halogenated with a halogen of atomic weight greater than fluorine, $R_2$ is a halogen radical of atomic weight greater than fluorine and $R_3$ is a radical selected from the group consisting of alkyl of up to three carbon atoms, halogen of atomic weight greater than fluorine and alkyl of up to three carbon atoms halogenated with a halogen of atomic weight greater than fluorine, with anhydrous hydrogen fluoride in the presence of a stannic halide as catalyst.

2. A process in accordance with claim 1 wherein the unsaturated halo hydrocarbon is vinyl chloride.

3. A process in accordance with claim 1 wherein the unsaturated halo hydocarbon is asym-dichloroethylene.

4. A process in accordance with claim 1 wherein the unsaturated halo hydrocarbon is 2-chloropropylene.

5. A process in accordance with claim 1 wherein said catalyst is stannic chloride.

6. A process for the production of 1-fluoro-1-chloroethane which comprises reacting from 1 to 1.2 mols of vinyl chloride with from 1 to 1.2 mols of anhydrous hydrogen fluoride in the presence of stannic chloride as catalyst, the weight of stannic chloride utilized being between 2.5% and 22.5% of the weight of vinyl chloride.

7. A process for the production of 1-fluoro-1-chloroethane which comprises reacting from 1 to 1.2 mols of vinyl chloride with from 1 to 1.2 mols of anhydrous hydrogen fluoride in the presence of stannic chloride as catalyst, at a temperature of between 10° C. and 80° C. and at a pressure at least equivalent to the vapor pressure of the reaction mixture at the temperature employed, the weight of stannic chloride utilized being between 2.5% and 22.5% of the weight of vinyl chloride.

JAMES CHAPMAN.
ROBERT ROBERTS.

REFERENCES CITED

The following references are of record in the file of this patent:

Henne at al. (A), Jour. Am. Chem. Soc., vol. 63, 2692-4 (1941).

Henne et al. (B), Jour. Am. Chem. Soc., vol. 70, 758-60 (1948).

Renoll, Jour. Am. Chem. Soc. vol. 64, 1115-6 (1942).

Whalley, Jour. Soc. Chem. Ind., vol. 66, 430-3 (1947).